United States Patent [19]

Burke

[11] 4,075,871
[45] Feb. 28, 1978

[54] DOUBLE CARDAN JOINT WITH ELASTOMERIC CENTERING MEANS

[75] Inventor: Harold J. Burke, Saginaw, Mich.

[73] Assignee: General Motors Corporation, Detroit, Mich.

[21] Appl. No.: 662,121

[22] Filed: Feb. 27, 1976

[51] Int. Cl.² .............................................. F16D 3/26
[52] U.S. Cl. ..................................... 64/17 R; 64/6; 64/11 R; 64/21
[58] Field of Search .................... 64/21, 17 R, 8, 7, 6, 64/11 R, 27 NM

[56] References Cited

U.S. PATENT DOCUMENTS

| 1,883,203 | 10/1932 | Whitehouse | 64/11 R |
| 2,051,248 | 8/1936 | Dom | 64/21 |
| 2,586,604 | 2/1952 | Bennett | 64/11 R |
| 3,016,721 | 1/1962 | Davis | 64/21 |
| 3,306,077 | 2/1967 | Piatti | 64/21 |
| 3,879,959 | 4/1975 | Clampett | 64/11 R |

*Primary Examiner*—Samuel Scott
*Assistant Examiner*—Randall Heald
*Attorney, Agent, or Firm*—F. J. Fodale

[57] ABSTRACT

A double Cardan universal joint has elastomeric centering means comprising an elastomeric pad carried by the input yoke which acts of the input cross member to bias it toward a perpendicular position with respect to the longitudinal axis thereof. A second elastomeric pad secured to the intermediate yoke which acts on the input and output cross members to bias the cross members toward a perpendicular position with respect to the longitudinal axis thereof, and a third elastomeric pad carried by the output yoke which acts on the output cross member to bias it toward a perpendicular position with respect to the longitudinal axis thereof.

9 Claims, 4 Drawing Figures

DOUBLE CARDAN JOINT WITH ELASTOMERIC CENTERING MEANS

This invention relates to universal joints and more particularly to double Cardan universal joints.

A double Cardan universal joint comprises an input yoke connected by an input cross member to an intermediate yoke which in turn is connected to an output yoke by an output cross member. Thus the double Cardan joint is a double jointed device wherein the joint angle between the longitudinal axes of the input yoke and the output yoke is distributed between an angle formed between the longitudinal axes of the input yoke and intermediate yoke and an angle formed between the longitudinal axes of the intermediate yoke and the output yoke. It is conventional practice to provide a centering means whereby the angle formed between the longitudinal axes of the input yoke and the intermediate yoke is approximately equal to the angle formed between the longitudinal axes of the intermediate yoke and the output yoke member in the plane of the joint angle. The plane of the joint angle is that plane defined by the axes of the input yoke, the intermediate yoke and the output yoke. As is well known in the art, when these two angles are exactly equal, the double Cardan joint transmits constant velocity. Known double Cardan joints however, only approximate constant velocity operation because the two angles are exactly equal at only one design angle. As the angle of the joint increases from the design angle in either direction, the velocity variations of the joint increase.

Conventionally, the centering means utilized in a double Cardan joint is a ball and socket arrangement in which a ball carried on the end of a stud protecting from either the input or output yoke is disposed in a socket carried on a longitudinal extension of the other yoke. Because the distance between the cross centers and the intersection point of the longitudinal axes of the input and output yokes varies with joint angle and either the ball or the socket is longitudinally fixed with respect to its associated yoke, this arrangement does not provide constant velocity operation as the intersecting point of the longitudinal axes of the input and output yokes determined by the fixed center of the ball (or socket) is not equidistant from the cross centers at all joint angles.

The object of this invention is to provide a double Cardan joint having unique and simple centering means comprising three elastomeric pads which theoretically at least provide constant velocity operation.

An advantage of a double Cardan joint having elastomeric centering means in accordance with this invention is that the centering means are more compact in the radial direction resulting in a reduced diameter of the intermediate yoke. The diameter of the intermediate yoke is essentially independent of the maximum joint angle contrary to the conventional ball and socket arrangement discussed previously wherein the ball and socket centers are always located at the vertex of the joint angle. Consequently, a universal joint in accordance with this invention is capable of higher joint angles for a given diameter of the intermediate yoke or in the alternative is capable of operating at the same maximum angle with an intermediate yoke which is smaller in diameter than that of the conventional double Cardan joint using a ball and socket type centering arrangement. The reduction in intermediate yoke diameter is important because it reduces the swing diameter of the joint and consequently the space requirements of the joint.

Another advantage of the universal joint in accordance with this invention is the economy of manufacture in that the precisely machined metal parts, springs and other components of the conventional ball and socket arrangement are replaced by three simple relatively inexpensive molded elastomeric pads.

Other objects and features of the invention will become apparent to those skilled in the art as the disclosure is made in the following detailed description of a preferred embodiment of the invention as illustrated in the accompanying sheets of drawings in which:

FIG. 1 is a side view, partially sectioned, of a double Cardan joint in accordance with this invention. In FIG. 1 the joint is bent at an angle and the axes of the input yoke, the intermediate yoke and the output yoke lie in the plane of the drawing. One pivot axis of each cross lies in the plane of the drawing while the other is perpendicular to the plane of the drawing.

FIG. 2 is a view similar to FIG. 1 with the joint bent at an identical angle to that shown in FIG. 1. The axes of the input yoke, the intermediate yoke, and the output yoke lie in the plane of the drawing. The joint, however, has been rotated 90° from the position of that shown in FIG. 1 so that the pivot axis of the crosses which were formerly in the plane of the drawing are now perpendicular to it.

Figure 2:
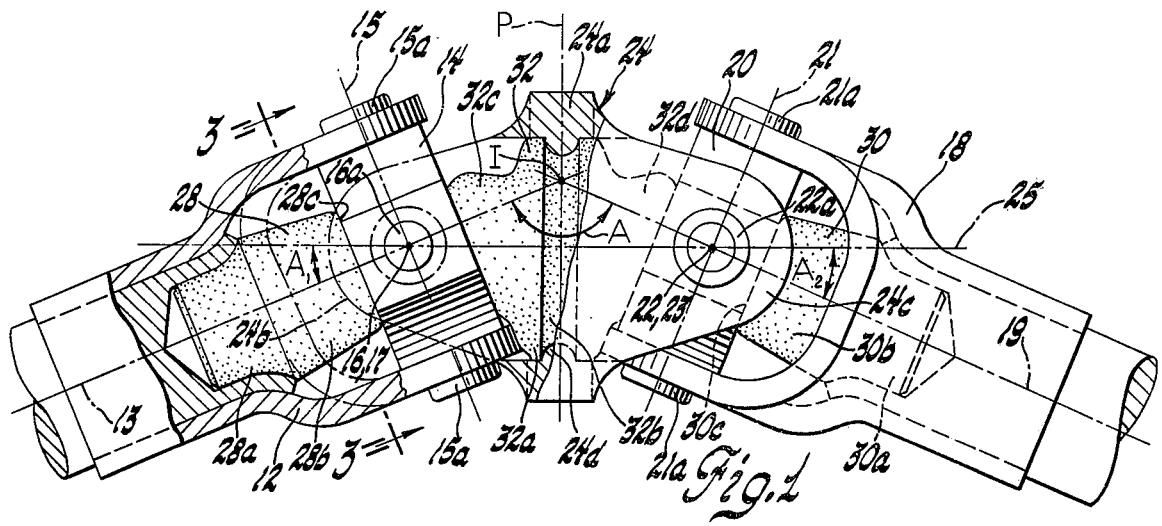
Figure 2:
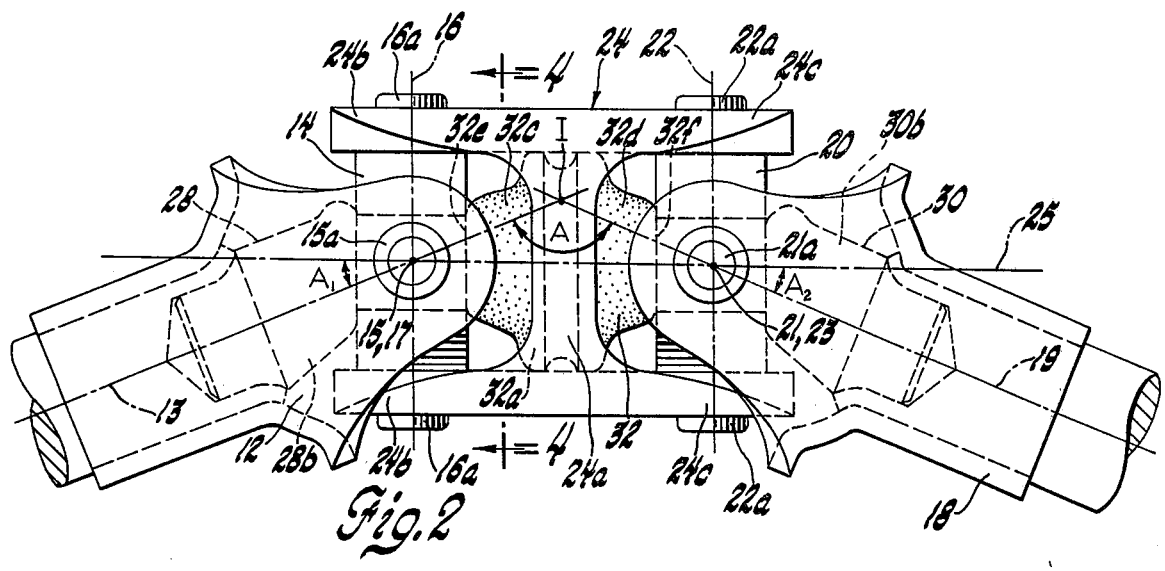
Figure 3:
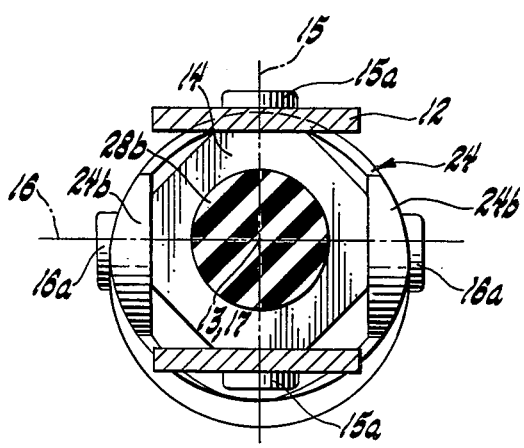
FIG. 3 is a section taken substantially along the line 3—3 of FIG. 1 and looking in the direction of the arrows.
Figure 4:
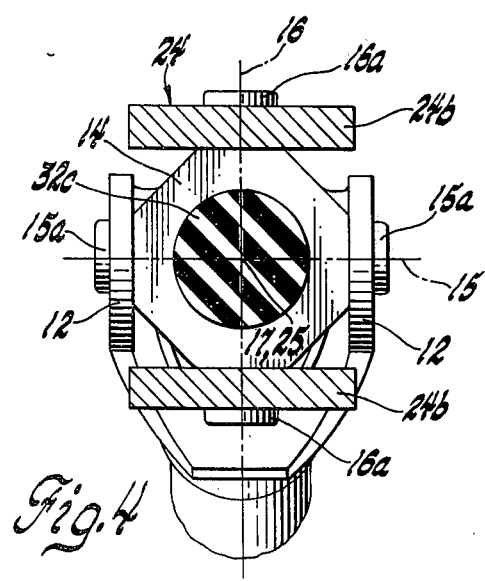
FIG. 4 is a section taken substantially along the line 4—4 of FIG. 2 and looking in the direction of the arrows.

Referring now to the drawings the Figures illustrate a double Cardan universal joint ball in accordance with this invention which is bent at an angle. The universal joint comprises an input yoke 12 having an axis of rotation 13 concentric with the axis of an input shaft to which it is fixed. A first or input cross member 14 comprises a body of uniform thickness, octogonal in cross section, having diametrically opposed sets of cylindrical trunions 15a and 16a concentrically located on mutually perpendicular coplanar pivot axes 15 and 16 which intersect at the cross center 17. The trunions 15a are journalled in the arms of the input yoke 12 so that the center 17 of the cross 14 intersects the axis of rotation 13 and the cross 14 is pivotable about the pivot axis 15.

An intermediate yoke 24 comprises a central annular portion 24a with two projecting sets of parallel ears 24b and 24c. The trunions 16a are journalled in the ears 24b in such a manner that the center 17 of the cross 14 intersects the axis of rotation 25 of the intermediate yoke 24 and the cross 14 is pivotable about the pivot axis 16.

A second or output cross member 20 of preferably identical construction as the first cross 14 also has two pairs of diametrically opposed cylindrical trunions 21a and 22a which lie on mutually perpendicular coplanar pivot axes 21 and 22 which intersect at the cross center 23. The two trunions 22a are journalled in the ears 24c of the intermediate yoke 24 such that the cross center 23 intersects the axis of rotation 25 of the intermediate yoke and the cross 20 is pivotable about the pivot axis 22. The trunions 21a are journalled in the ears 24c of an output yoke 18 such that the cross center 23 also intersects the axis of rotation 19 of the output yoke 18 and the cross 20 is pivotable about the pivot axis 21. The output yoke 18 is fixed to an output shaft concentrically therewith.

As thus far described the structure of the double Cardan joint is rather conventional and the yokes and crosses are described in relatively interchangeable terms, as the input yoke 12 and input cross 14 may be an output yoke and cross while the other yoke and cross may be input members.

As mentioned in the introduction, the novelty of this invention resides in the centering means for distributing the joint angle (Angle A formed by the axis 13 of the input yoke 12 and the axis 19 of the output yoke 18) between an acute angle $A_1$ formed between the axes 13 and 25 and an angle $A_2$ formed between the axes 25 and 19.

Generally, this distribution is accomplished by the three elastomeric pads 28, 30 and 32. The pad 28 is a body of revolution concentrically located on the axis 13. More specifically, the pad 28 comprises a plug portion 28a received in an end cavity of the input shaft and a slightly tapered bumper portion 28b which has a flat circular face 28c engaging the exterior side face of the cross 14. The elastomeric pad 28 is preferably under a slight axial compression when in the position shown in FIG. 1. In any event, the elastomeric pad 28 acts on the cross 14 to resiliently bias it toward a position where the pivot axis 16 is perpendicular to the axis of rotation 13 as shown in FIG. 1.

Similarly, the output shaft and yoke 18 carry a second elastomeric pad 30 comprising a body of revolution mounted concentrically with the axis of rotation 19. The elastomeric pad 25 has a plug portion 30a received in an end cavity of the output shaft and a slightly tapered bumper portion 30b which has a flat circular end face 30c engaging the exterior side face of the output cross member 20. The pad 30 is preferably under a slight axial compression when in the position shown in FIG. 1. The pad 30 acts on the second cross 20 to resiliently bias it toward a position where the pivot axis 22 is perpendicular to the axis of rotation 19 as shown in FIG. 1. The crosses 14 and 20 are preferably identical and pads 28 and 30 are preferably identical particularly with regard to the area of contact between the flat circular end faces 28c and 30c and the exterior side faces of their associated crosses 14 and 20. In any event, the pads 28 and 30 should be designed in conjunction with their respective crosses 14 and 20 such that each offers substantially identical increasing resistance to pivotal movement of the crosses 14 and 20 about their respective pivot axes 15 and 21 which resistance increases in proportion to increasing angular displacement of the crosses about the pivot axes 15 and 21 from an upright or perpendicular position with respect to the axes of rotation 13 and 19.

The third pad 32 is also a body of revolution. It comprises an enlarged central portion 32a having a circumferential groove 32b which receives a circumferential bead 24d of the intermediate yoke 24 by means of which the pad 32 is concentrically located on the axis of rotation 25 and is secured against axial sliding movement with respect to the intermediate yoke 24. The third pad 32 has oppositely projecting slightly tapered bumper portions 32c and 32d with flat circular end faces 32e and 32f respectively. The flat end faces 32e and 32f respectively engage the interior side faces of the crosses 14 and 20 and each bumper portion is preferably under a slight axial compression when in the position shown in FIG. 2. The bumper 32c acts on the cross 14 to bias it toward a position where the pivot axis 15 is perpendicular to the axis of rotation 25 as shown in FIG. 2. The bumper 32d acts on the cross 20 to resiliently bias it toward a position where the pivot axis 21 is perpendicular to the axis of rotation.

As stated previously the crosses 14 and 20 are preferably identical. The bumper portions 32c and 32d are likewise preferably identical, particularly with regards to the area of contact between the end faces 32e and 32f and the internal side faces of their associated crosses 14 and 20. In any event, the bumpers 32c and 32d should be designed in conjunction with the crosses 14 and 20 to provide substantially equal resistance to the crosses 14 and 20 pivoting about the pivot axes 16 and 22 from positions where the pivot axes 15 and 21 are perpendicular to the axis of rotation 25. As before this resistance should increase with increasing angular displacement of the crosses 14 and 20 about the pivot axes 16 and 22 from perpendicular positions with respect to the axis of rotation 25.

OPERATION OF THE CENTERING MEANS

FIG. 1 shows the joint bent at an angle A. The axes of rotation 13, 19 and 25 lie in the plane of the drawing and Angle A defined by the axes of rotation 13 and 19 is the true joint angle. By simple geometrical analysis it can be seen that when the intersection point I of the axes of rotation 13 and 19 forming the vertex of Angle A lies in a plane P which is perpendicular to the axis of rotation 25 and equidistant from the cross centers 17 and 23, Angle $A_1$ is equal to Angle $A_2$ and the joint transmits constant velocity. In the position shown in FIG. 1, the angles $A_1$ and $A_2$ are formed entirely by pivoting of the crosses 14 and 22 about pivot axes 16 and 22 which distorts the elastomeric bumpers 32c and 32d respectively. Since these elastomeric bumpers are designed so that each offers the same increasing resistance to pivotal movement of the crosses 14 and 20 about the pivot axes 16 and 22, Angle $A_1$ equals Angle $A_2$ and thus the joint transmits constant at the instant it is in the position shown in FIG. 1.

Referring now to FIG. 2, the joint is shown with each of the yokes 12, 18 and 24, rotated 90° about their longitudinal axes of rotation from the position shown in FIG. 1. In the FIG. 2 position, the axes of rotation 13, 19 and 25 are still in the plane of the drawing, and the axes of rotation 13 and 19 are still bent at the same Angle A. In this position however, the bumpers 32c and 32d are inactive since the crosses 14 and 20 cannot pivot about the pivot axes 16 and 22. Thus the Angles $A_1$ and $A_2$ are formed entirely by the crosses 14 and 20 pivoting about the pivot axes 15 and 21 distorting the elastomeric bumpers 28b and 30b. Since the elastomeric bumpers 28b and 30b are designed so that each offers identical increasing resistance to pivotal movement of their associated crosses 14 and 20 about their respective pivot axes 15 and 21, Angle $A_1$ equals Angle $A_2$ and the joint transmits constant velocity at the instant it is in the position shown in FIG. 2.

As the joint rotates from the position shown in FIG. 1 to the position shown in FIG. 2 the cross 14 simultaneously pivots about pivot axes 15 and 16 while the cross 20 simultaneously pivots about pivot axes 21 and 22. In each interim position, the Angles $A_1$ and $A_2$ are each formed by their associated crosses 14 and 20 each tilting or pivoting about their two mutually perpendicular pivot axes 15–16 and 21–22. Thus, the Angle $A_1$ is a trigonometric product of two component angles formed respectively by the pivoting of cross 14 about pivot axis 15 from a position perpendicular to axis of rotation 13 and the pivoting of cross 14 about pivot axis 16 from a position perpendicular to axis of rotation 25. (Note the Angle $A_1$ shown in FIG. 1 is in fact a trigonometric product of two component angles. However, one component angle — the component angle formed by pivoting of the cross 14 about pivot axis 15 — is zero and thus the Angle $A_1$ is equal to the other component angle formed by the cross 14 pivoting about pivot axis 16 from a position perpendicular to axis of rotation 25. The same applies to the Angle $A_1$ and the Angles $A_1$ and $A_2$ shown in FIG. 2). Similarly, the Angle $A_2$ at any given instant is a trigonometric product of two component angles formed respectively by pivoting of the cross 20 about pivot axis 22 from a position perpendicular to axis of rotation 25 and the pivoting of the cross 20 about pivot axis 21 from a position perpendicular to axis of rotation 19. Since the angles $A_1$ and $A_2$ at each instant, each have two corresponding component angles, respective ones of which when formed distort elastomeric bumpers 28b and 30b which provide identical resistance to formation of these component angles and the other ones of which distort elastomeric bumpers 32c and 32d which provide identical resistance to formation of these component angles it follows that the corresponding component angles are equal. This being the case, the Angles $A_1$ and $A_2$ are always equal and the joint transmits constant velocity at all positions of rotation.

It should be noted that the resistance of elastomeric bumpers 28b and 30b while identical need not be related to the identical resistance of elastomeric bumpers 32c and 32d because the manner in which the component angles of Angle $A_1$ are related to each other is not determined by the bumpers 28b and 30c associated with cross 14. These component angles are related to each other by the position of the axes of rotation 13 and 25 in the same manner as a simple Cardan joint. The same holds true for the component angles of Angle $A_2$.

Of course from a practical sense, precisely identical resistances of the paired elastomeric bumpers 28b — 30b and 32c — 32d may be very difficult to achieve. However, the joint should transmit relatively constant velocity and in any event the velocity variations will be much less severe than that of an ordinary Cardan joint. It should also be noted that since the input and output yokes 14 and 18 are not mechanically coupled by a ball and socket arrangement, the location of the intersection point I of the axes 13 and 19 need not necessarily lie within the intermediate yoke 24. Thus the joint may operate at higher angles or have an intermediate yoke of reduced diameter in comparison to double Cardan joints having conventional ball and socket centering arrangements.

From the foregoing it can be seen that this invention provides a double Cardan universal joint which transmits constant or nearly constant velocity with a simple and compact centering means.

I wish it to be understood that I do not desire to be limited to the exact details of construction shown and described, for obvious modifications will occur to a person skilled in the art.

What is claimed is:

1. A universal joint comprising,
an input yoke having an input axis of rotation,
an output yoke having an output axis of rotation,
an intermediate yoke having an intermediate axis of rotation,
an input cross connecting said input yoke to an end of said intermediate yoke,
an output cross connecting another end of said intermediate yoke to said output yoke, and
centering means comprising,
first resilient means engaging said input yoke and said input cross and biasing said input cross toward a position where said input cross is perpendicular to said input axis,
second resilient means engaging said output yoke and said output cross and biasing said output cross toward a position where said output cross is perpendicular to said output axis and,
third resilient means engaging said intermediate yoke and said input and output crosses biasing said input and output crosses toward positions where said input and output crosses are perpendicular to said intermediate axis.

2. A universal joint comprising;
an input yoke having an input axis of rotation,
an output yoke having an output axis of rotation,
an intermediate yoke having an intermediate axis of rotation,
an input cross pivotally connected to said input yoke and an end of said intermediate yoke respectively about mutually perpendicular pivot axes,
an output cross pivotally connected to another end of said intermediate yoke and said yoke respectively about mutually perpendicular pivot axis, and
centering means comprising;
first resilient means engaging said input yoke and said input cross and providing a resistance against pivoting of said input cross with respect to said input yoke away from a position where said input cross is perpendicular to said input axis which resistance increases as said input cross pivots away from said last mentioned position,
second resilient means engaging said output yoke and said output cross and providing a resistance against pivoting of said output cross with respect to said output yoke away from a position where said output cross is perpendicular to said output axis which resistance increases as said output cross pivots away from said last mentioned position, and
third resilient means engaging said intermediate yoke and said input and output crosses and providing a resistance against pivoting of said input and output crosses away from positions where said input and output crosses are perpendicular to said intermediate axis which resistance increases as said input and output crosses pivot away from said last mentioned positions.

3. A universal joint as defined in claim 2 wherein said first and second resilient means provide substantially identical resistance against respective pivoting of said input and output crosses from the positions where said crosses are perpendicular to said input and output axes respectively and wherein said third resilient means provides substantially identical resistance against pivoting of each of said input and output crosses away from the positions where said input and output crosses are perpendicular to said intermediate axes whereby said input axis and said intermediate axis form an angle which is substantially identical to an angle formed between said intermediate axis and said output axis when said input and output axes are bent at an angle.

4. A universal joint comprising;
an input yoke having an input axis of rotation, an output yoke having an output axis of rotation,
an intermediate yoke having an intermediate axis of rotation,
an input cross connecting said input yoke to an end of said intermediate yoke,
an output cross connecting another end of said intermediate yoke to said output yoke, and
centering means comprising;
first elastomeric pad means carried by said input yoke and acting on said input cross to bias said input cross toward a position where said input cross is perpendicular to said input axis,
second elastomeric pad means carried by said output yoke and acting on said output cross to bias said output cross toward a position where said output cross is perpendicular to said output axis and,
third elastomeric pad means affixed to said intermediate yoke and acting on said input and output crosses to bias said input and output crosses toward positions where said input and output crosses are perpendicular to said intermediate axis.

5. A universal joint comprising;
an input yoke having an input axis of rotation,
an output yoke having an output axis of rotation,
an intermediate yoke having an intermediate axis of rotation,
an input cross pivotally connected to said input yoke and an end of said intermediate yoke respectively about mutually perpendicular pivot axes which intersect at a first center intersecting said input and intermediate axes of rotation,
an output cross pivotally connected to another end of said intermediate yoke and said output yoke respectively about mutually perpendicular pivot axes, which intersect at a second center spaced from said first center and intersecting said intermediate and output axes of rotation, and
centering means biasing said yokes toward a position where their respective axes of rotation are colinear comprising,
first elastomeric pad means engaging said input yoke and said input cross and providing a resistance against pivoting of said input cross with respect to said input yoke away from a position where said input cross is perpendicular to said input axis which resistance increases as said input cross pivots away from said last mentioned position,
second elastomeric pad means engaging said output yoke and said output cross and providing a resistance against pivoting of said output cross with respect to said output yoke away from a position where said output cross is perpendicular to said output axis which resistance increases as said output cross pivots away from said last mentioned position, and
third elastomeric pad means affixed to said intermediate yoke and engaging said input and output crosses for providing a resistance against pivoting of said input and output crosses away from positions where said input and output crosses are perpendicular to said intermediate axes which resistance increases as said input and output crosses pivot away from said last mentioned positions.

6. The universal joint defined in claim 5 wherein
said first and second elastomeric pad means provide substantially identical resistance against respective pivoting of said input and output crosses from the positions where said crosses are perpendicular to said input and output axes respectively and wherein said third elastomeric pad means provide substantially identical resistance against pivoting of each of said input and output crosses away from the positions where said input and output crosses are perpendicular to said intermediate axes whereby said input axis and said intermediate axis form an angle which is substantially identical to an angle formed between said intermediate axis and said output axis when said input and output axes are bent at an angle.

7. The universal joint defined in claim 5 wherein said first and second elastomeric pad means such comprise a body of revolution having a mounting portion carried concentrically by said input and output yokes respectively and a bumper portion engaging an exterior side face of said first and second crosses respectively, and wherein said third elastomeric pad means comprises a body of revolution having a central mounting portion which is carried concentrically secured to said intermediate yoke and oppositely extending bumper portion engaging an interior side face of said first and second crosses respectively.

8. The universal joint defined in claim 6 wherein said first and secon elastomeric pad means each comprises a body of revolution having a mounting portion carried concentrically by said input and output yokes respectively and a bumper portion engaging an exterior side face of said first and second crosses respectively, and wherein said third elastomeric pad means comprises a body of revolution having a central mounting portion which is carried concentrically secured to said intermediate yoke and oppositely extending bumper portion engaging an interior side face of said first and second crosses respectively.

9. The universal joint defined in claim 5 wherein said first second and third elastomeric pad means are each preloaded in axial direction.

* * * * *

UNITED STATES PATENT OFFICE
CERTIFICATE OF CORRECTION

Patent No. 4,075,871  Dated February 28, 1978

Inventor(s) Harold J. Burke

It is certified that error appears in the above-identified patent and that said Letters Patent are hereby corrected as shown below:

Title page, column 1, second cited reference, "Dom" should read -- Dunn --.

Column 6, line 28, after "and said" insert -- output --.

Column 8, line 28, "such" should read -- each --.

Column 8, line 40, "secon" should read -- second --.

*Signed and Sealed this*

*Eleventh* Day of *July 1978*

[SEAL]

*Attest:*

RUTH C. MASON
*Attesting Officer*

DONALD W. BANNER
*Commissioner of Patents and Trademarks*